July 7, 1936.  M. W. REEVES  2,046,581
ROAD EDGE DETERMINING GUIDE
Filed Dec. 5, 1935
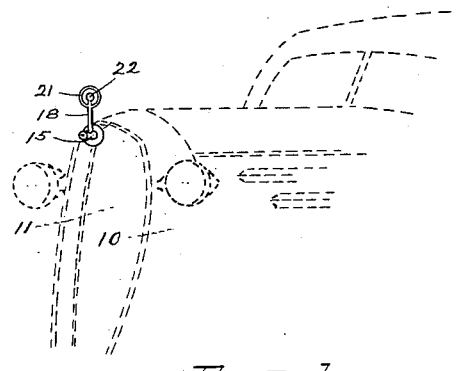
Fig 1
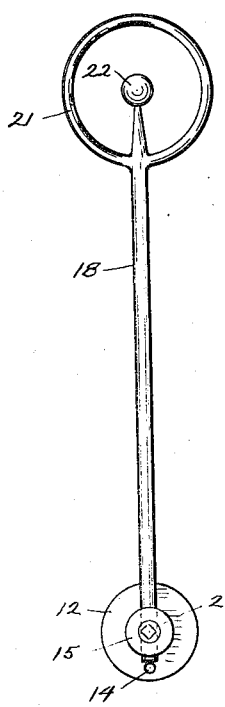
Fig 2
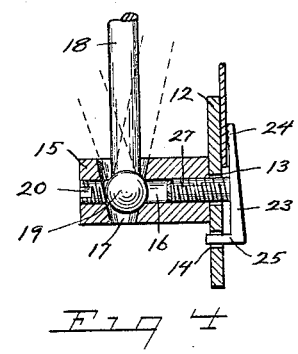
Fig 4
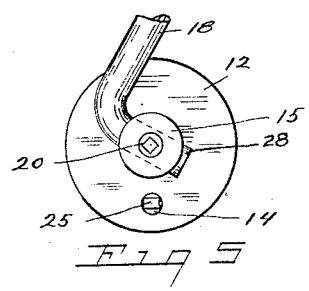
Fig 5
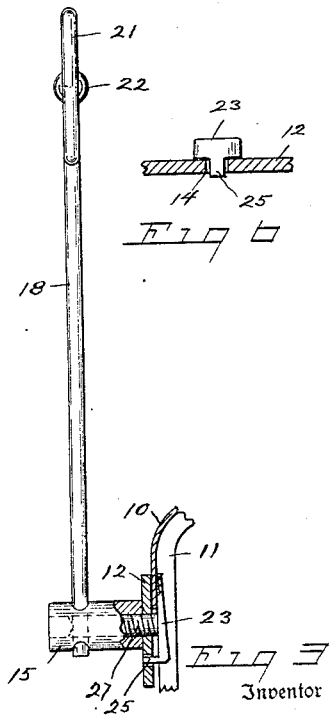
Fig 6
Fig 3
Inventor
Mark W. Reeves
By John J Thompson
Attorney Patented July 7, 1936

2,046,581

UNITED STATES PATENT OFFICE 2,046,581

ROAD EDGE DETERMINING GUIDE

Mark W. Reeves, Clinton, Conn.

Application December 5, 1935, Serial No. 52,959

3 Claims. (Cl. 248—40)

This invention relates to an accessory for vehicles and comprises a driving and parking guide, whereby the driver can determine the relation between the right front wheel and the edge of the road or pavement.

Guide rods for this purpose have been devised, but they have been either for attachment to one or both of the front fenders or to the radiator filler cap, and when attached to the fender they are readily bent out of alignment and are under constant vibration when the car is moving, and further, are not in the proper line of vision between the driver and the edge of the road.

The modern automobile not only does not have any radiator filler cap in an exposed position so that a guide could be attached to it, but also the radiators are constructed with an outer grid, not only V-shaped but curved, rendering it almost impossible to provide a guide device provided with a universal attaching means.

In the present invention which is an improvement over the design described in my patent application filed January 31, 1933, Serial No. 654,443, I have designed a novel road edge determining means for attachment to any style of automobile radiator which is provided with a shell or casing and I have also provided means whereby the device is provided with adjustment in all directions, enabling it to be set and rigidly secured within the line of vision between the driver and a predetermined distance in advance of the vehicle and in line with the right front wheel.

The object of the invention is to provide an accessory or attachment for this purpose which can be readily mounted upon the front of the vehicle.

Another object is to provide an object of this kind which shall be simple, durable, efficient, contain few parts, and those of an adjustable nature.

Another object of the invention is to provide a driving guide or sight adaptable for attachment to a curved radiator shell in such a manner as to be free from vibration.

Another object of the invention is to provide a road edge determining and sighting device of the unit type, not depending upon any rear sight having to be attached to the windshield or instrument board, and the object of the ring is to confine the vision in a similar manner as that of the front globe sight of a rifle.

With these and other objects in view, my invention consists in certain new and novel construction and combination of parts as set forth in the following specification and claims and further illustrated in the accompanying drawing, it being understood that slight changes may be made without departing from the spirit of the invention.

In the drawing:

Figure 1 shows the device attached to the upper part of the shell of a curved automobile radiator.

Figure 2 is a front elevation of the device, apart from the radiator.

Figure 3 is a side elevation of the same, shown partly in section and attached to the shell of the radiator.

Figure 4 shows an enlarged, detail, sectional view of the clamping member, both for the radiator and the staff.

Figure 5 is a partial front view of a modified form of staff which is adaptable to V-shaped radiator grills.

Figure 6 is a transverse sectional view of the plate 12, and an end view of the T-bolt 27 showing their relationship to each other.

Referring to the drawing:

The curved radiator shell is indicated by the numeral 10 and the vertical road grill by the numeral 11.

The clamping device comprises a plate or washer 12 formed with a center opening 13 and a parallel transverse hole 14. Mounted in front of this plate 12 is a body member 15 formed with an axial bore 16 and a transverse intersecting tapered bore 17. The bore 16 being provided with internal threads designed at its two ends. Mounted within the tapered bore 17 is a partly adjustable staff which is provided at its lower end with a ball 19, providing a ball and socket mounting, allowing the staff to be adjusted in all directions, especially from the perpendicular. This ball end 19 being locked within the tapered bore 17 at the desired angle, having the set screw 20 threaded into the other end of the bore 16.

The upper end of the staff 18 being formed with a ring 21 and a spherical sight 22 secured on the upper end of the staff and located within the center of the ring 21.

For securing the device to the radiator shell 10, there is provided a T-shaped bolt 27 for engagement with the threaded inner end of the bore 16, and provided with a head 23 having a serrated end 24 for engagement with the inner surface of the edge of the radiator shell 10, and a tongue 25 adapted to enter the hole 14 in the plate 12 to prevent accidental rotation of the bolt 27, thus providing the clamp for adjustment to the sheet metal shell 10 of the radiator and not depending upon rods and bolts passed through the honeycomb of the radiator proper.

For providing for a V-shaped curved radiator, in place of the ball 19, the lower end of the staff 18 may be formed with a hook 28 passed through the straight transverse bore of the member 15 which will enable the staff to be located in the proper position as indicated in Figure 5.

Having thus described my invention, what I claim as new and desire to secure by Letters Patent, is:

1. In a driving guide for vehicles, comprising a clamping member formed with a threaded axial bore and a transverse intersecting bore, a plate adapted to be mounted between the rear end of said clamping member and the vehicle radiator, a T-headed clamp bolt threaded into the axial bore of the clamping member and adapted to retain a portion of the radiator between its head and the plate, an upright staff, clamping means formed on the lower end thereof and located in the transverse bore of the clamping member, a locking screw threaded into the axial bore of the clamping member for engagement with the clamping means on the lower end of the staff to retain said staff in an adjustable relation with the clamping member.

2. A driving guide for attachment to vehicle radiators, comprising a clamp member formed with a threaded axial bore and having a transverse tapered bore, a flat clamping plate formed with a central opening and a second opening spaced therefrom and adapted to contact with one end of said clamp member, a T-shaped bolt extending through the central opening in the plate and threaded into the end of the axial bore of the clamp member, a spur formed on the T-head of the bolt and adapted to enter the second opening in the plate to prevent rotary movement between the bolt and the plate, a set screw threaded into said axial bore, an upright staff adapted to have its lower end adjustably retained within the transverse bore by said set screw.

3. A driving guide for attachment to vehicle radiators, comprising a clamp member formed with a threaded axial bore and having a transverse tapered bore intersecting the axial bore and recessed at its intersection, a clamping plate in adjustable contact with the inner end of said clamp member, a T-headed clamp bolt threaded into said clamp member, passing through said clamping plate and adapted to grip the shell of the radiator between the head of the bolt and the plate, means for preventing rotary movement between the bolt and the plate, a staff adjustably secured in the transverse bore and recessed intersection of the axial bore by a set screw threaded into the outer end of the clamp member.

MARK W. REEVES.